April 10, 1962     O. G. STEEDE     3,028,803
MACHINE FOR APPLYING SPIRAL STRIPES TO TUBULAR MEMBERS
Filed March 25, 1959     5 Sheets-Sheet 1

INVENTOR.
OTHO G. STEEDE
BY W. B. Harpman
ATTORNEY

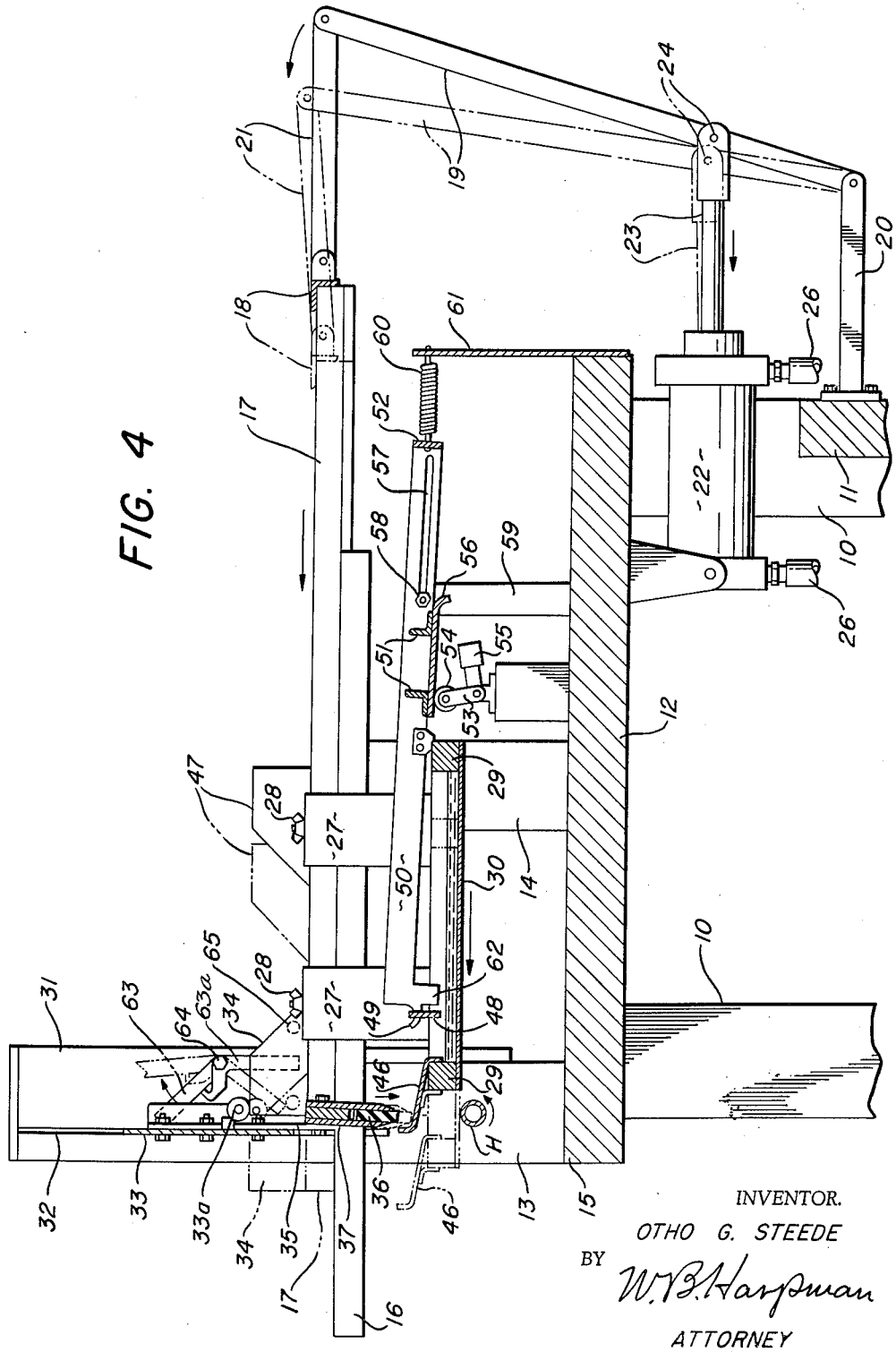

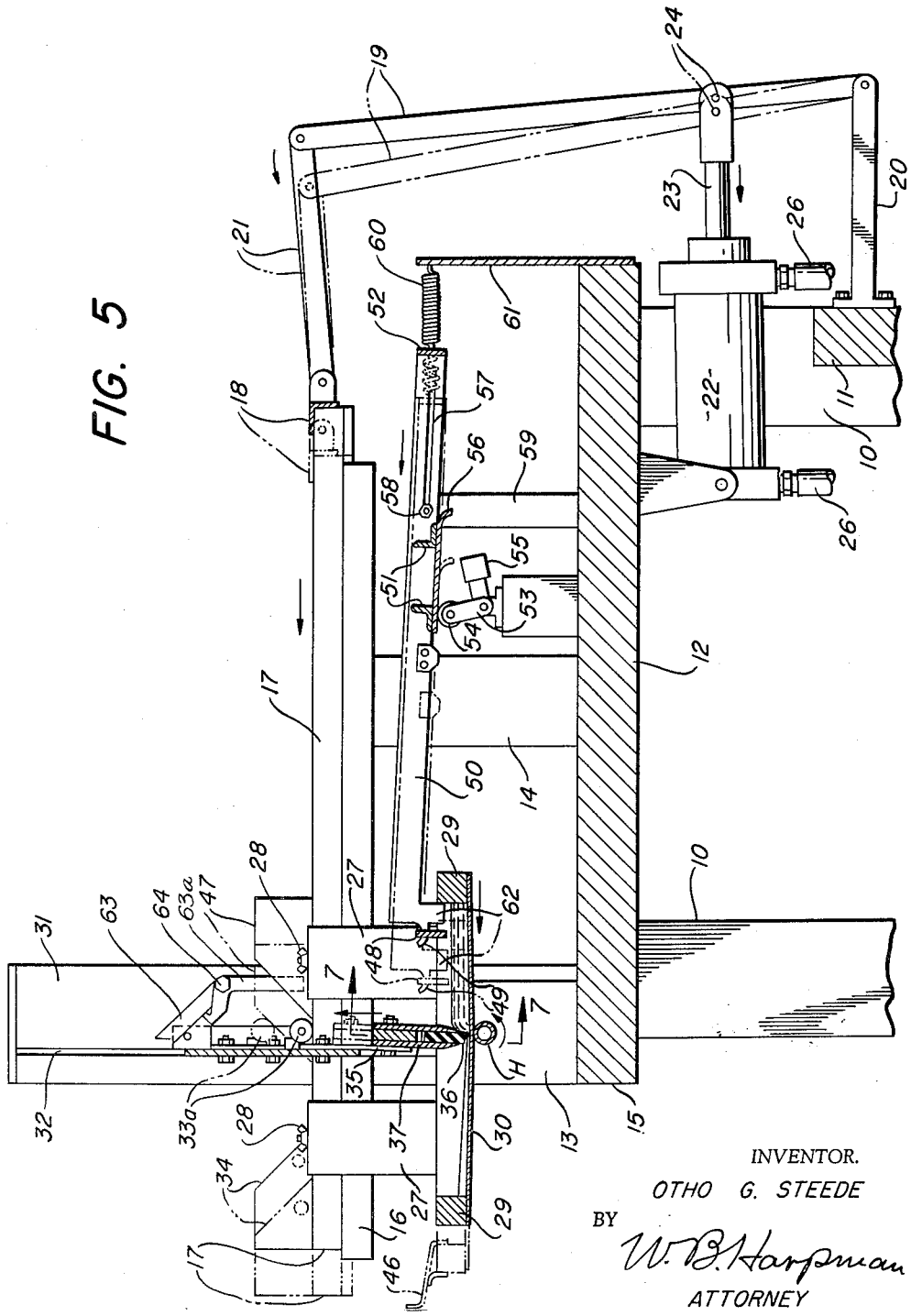

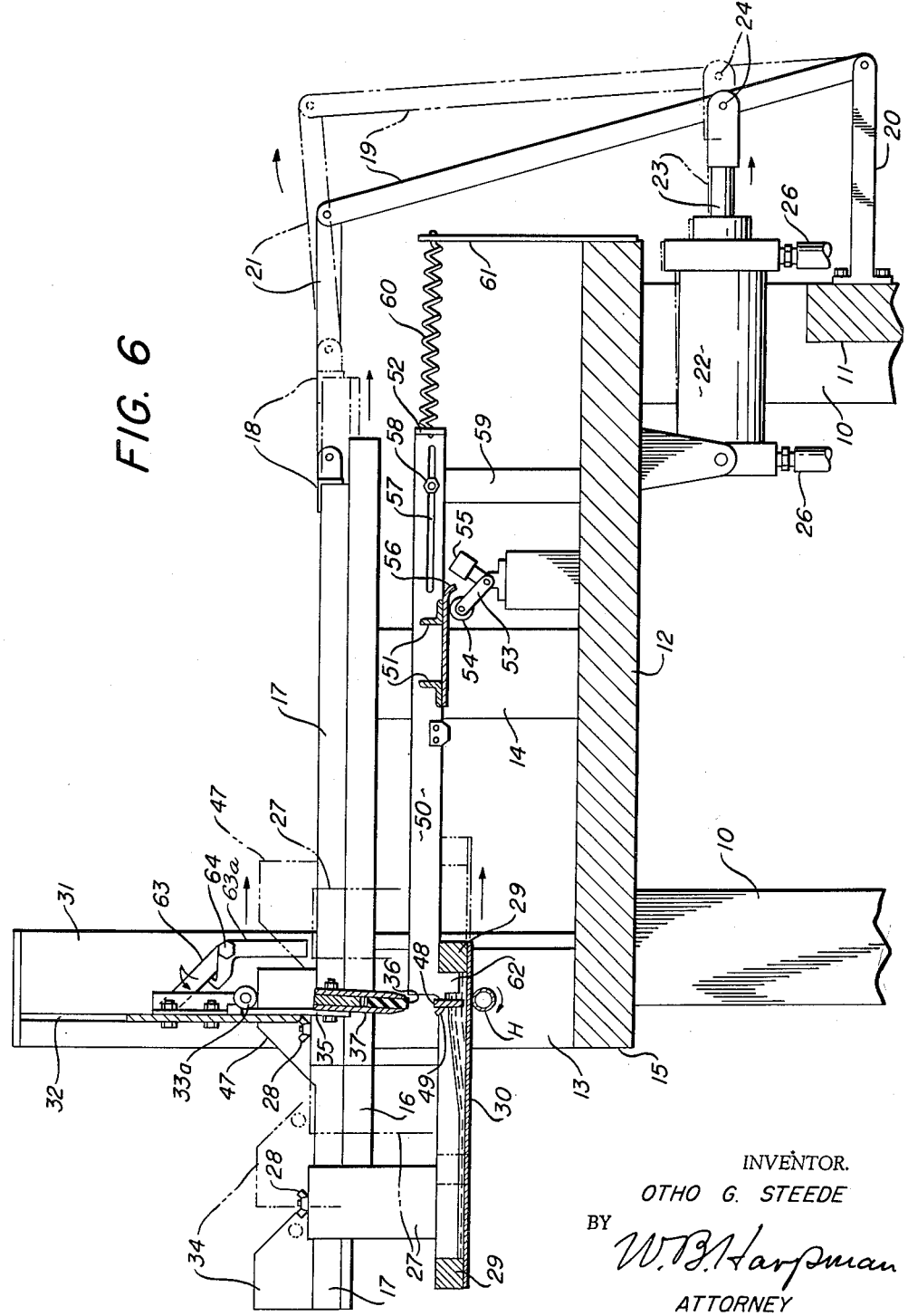

April 10, 1962   O. G. STEEDE   3,028,803
MACHINE FOR APPLYING SPIRAL STRIPES TO TUBULAR MEMBERS
Filed March 25, 1959   5 Sheets-Sheet 5
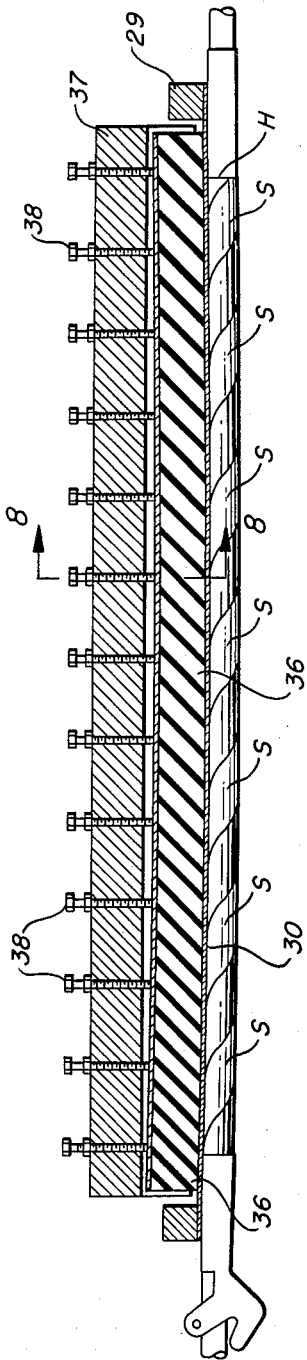
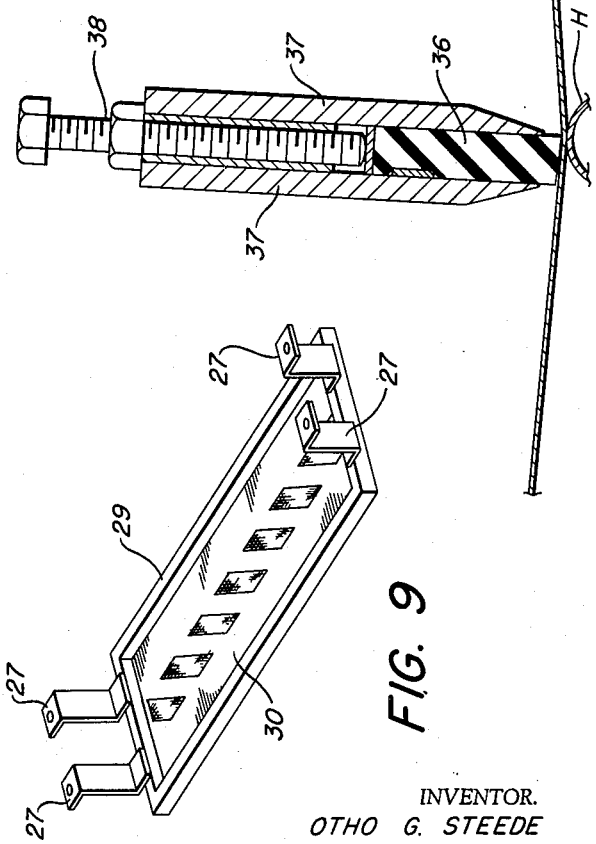
INVENTOR.
OTHO G. STEEDE
BY
*W B Harpman*
ATTORNEY

United States Patent Office 3,028,803
Patented Apr. 10, 1962

3,028,803
MACHINE FOR APPLYING SPIRAL STRIPES
TO TUBULAR MEMBERS
Otho G. Steede, Alliance, Ohio, assignor to The Lewis Engineering & Mfg. Company, Alliance, Ohio, a corporation of Ohio
Filed Mar. 25, 1959, Ser. No. 801,771
3 Claims. (Cl. 101—124)

This invention relates to a machine for applying spiral stripes to tubular members.

The principal object of the invention is the provision of a machine which will apply a spiral painted stripe to a tubular handle of a garden tool.

A further object of the invention is the provision of a machine which will apply spiral stripes to any elongated tubular member.

A still further object of the invention is the provision of a machine in which a tubular member is rotated on a fixed axis while a design applying screen is moved transversely thereof.

A still further object of the invention is the provision of a machine which will apply spiral striping to tubular members rapidly and inexpensively.

The machine for applying spiral stripes and designs and the like to tubular members such as the handles of garden tools as disclosed herein enables the garden tool, such as a long handled grass shears, to be decorated in an eye catching highly ornamental manner on a production basis. The sale of garden tools having cross sectionally round handles is highly competitive and the eye appeal of the tools frequently results in their sale.

The present invention relates to a machine which will apply spiral striping to such handles quickly and inexpensively thereby enhancing the appearance of the handles and increasing the salability of the tools on which they are employed. A machine meeting the requirements imposed by commercial production of such tools must be capable of handling a number of handles in a relatively short time applying the striping or other decoration rapidly and accurately and using paints, enamels and similar coatings which will dry rapidly and permit handling of the decorated tools. It is accordingly a further object of the invention to provide a machine to meet these several qualifications.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 4 is an enlarged vertical section on line 4—4 of FIGURE 1 showing the machine at the beginning of a cycle.

FIGURE 5 is a view comparable with FIGURE 4 showing operating movement and repositioning of the several parts of the machine midway through a cycle.

FIGURE 6 is a view comparable with FIGURE 5 showing movement and repositioning of the several parts of the machine at the completion of a cycle.

FIGURE 7 is a vertical section on line 7—7 of FIGURE 5.

FIGURE 8 is an enlarged cross section on line 8—8 of FIGURE 7.

FIGURE 9 is a view of a silk screen used in the machine.

Figures 1, 2, 3:
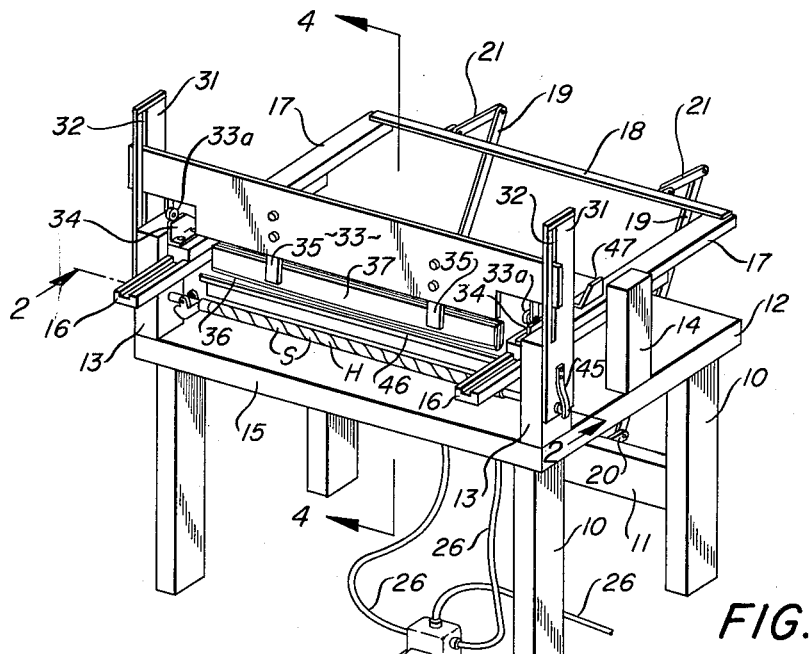
FIGURE 1 is a perspective view of the machine for applying spiral striping to tubular members.
FIGURE 2 is an enlarged cross sectional elevation on line 2—2 of FIGURE 1 with parts broken away.
FIGURE 3 is a vertical section on line 3—3 of FIGURE 2.

By referring to the drawings and FIGURE 1 in particular it will be seen that a machine for applying spiral striping to tubular members including cross sectionally round handles and the like comprises a base including legs 10 having a cross member 11, and a top 12. The top 12 is substantially rectangular and has two pairs of upright frame members 13 and 14 secured thereto and extending thereabove. The pair of frame members 13 are disposed on the sides of the top 12 adjacent the front 15 of the machine and the pair of frame members 14 are disposed midway of the sides of the top 12 and one at each side thereof. Horizontally disposed parallel channels 16 are positioned one at either side of the machine and supported on the frame members 13 and 14. Channel engaging members 17 are positioned one on each of the horizontally disposed channels 16 in sliding engagement therewith and the channel engaging members 17 are joined at their back ends by an angular member 18. Arms 19, which are pivoted at their lowermost ends to brackets 20, secured on the cross member 11 of the base of the machine extend upwardly by way of links 21 with the angle member 18.

A pneumatic piston and cylinder assembly 22 is mounted beneath the top 12 and the piston rod 23 thereof is pivoted at its outermost end as by the pivot 24 to one of the arms 19 so that operation of the pneumatic cylinder results in reciprocal motion of the channel engaging members 17. Control of the pneumatic piston and cylinder 22 is by a foot control valve 25 with flexible tubing 26 establishing communication between the pneumatic cylinder 22, the foot control valve 25 and a source of compressed air (not shown). The valve 25 is arranged so that upon being depressed the piston 23 retracts moving the channel engaging members 17 forwardly as shown in FIGURE 1 and upon being released extends so as to move the channel engaging members 17 rearwardly. Two pair of oppositely disposed brackets 27 are removably affixed to the channel engaging members 17 as by bolt and nut assemblies 28 and support a silk screen frame 29 therebelow, as best shown in FIGURE 2 of the drawings.

A silk screen 30 is mounted on the bottom of the silk screen frame 29 and an appropriate design is formed therein. (See FIGURE 9.) In the present instance the design comprises a longitudinal row of diagonally inclined sections 66, which when moved transversely of a rotating tube will apply a plurality of sections of a continuously extending spiral stripe S to the tube. Each of the upright frame members 13 has a vertically slotted extension 31 thereon, the slots therein being indicated by the numerals 32. A squeegee frame member 33 is positioned longitudinally above the silk screen frame 29 with its ends engaged in the vertical slots 32 in the extension 31 and supported on rollers 33a (as shown in FIGURE 1) which are in turn engaged on cams 34 positioned on the channel engaging members 17 adjacent their forward ends. The squeegee frame member 33 has portions 35 depending therebelow which portions 35 engage and hold a longitudinally disposed squeegee 36 which is adjustably positioned in a carrier 37 which in turn is provided with a plurality of adjusting screws 38 which act to bow the squeegee 36 longitudinally and cause it to conform with the slightly bowed contour of the silk screen 30 which in turn matches the slight bow present in a tubular handle positioned in the machine beneath the silk screen frame 29 as may best be seen in FIGURES 7 and 8 of the drawings.

The upright frame members 13 are drilled to provide journals for a pair of shafts 39 and 40. The shaft 39 is fixed in rotatable position and has a gear 41 secured thereto which in turn is in registry with a rack 42 which is attached to and depends from one of the channel engaging members 17, as best seen in FIGURES 2 and 3 of the drawings. It will thus be seen that reciprocating motion of the channel engaging members 17, as heretofore described, will move the rack 42 relative to the gear 41 and hence rotate the shaft 39. The shaft 40 is positioned in axial alignment with the shaft 39 in a slidable and rotatable manner in the frame member 13 and is provided with an inner end 43 of lesser diameter which matches an inner end 44 of lesser diameter on the shaft 39 so that a tubular handle H may be positioned on the ends 43 and 44 and held in that position and rotated by the shaft 39. A leaf spring 45 is secured to the upright frame member 13 so as to engage one end of the shaft 40 and normally urges the shaft 40 inwardly of the machine. The handle H is positioned on the shafts 39 and 40 by moving the shaft 40 outwardly to provide room for positioning the handle H on the ends 43 and 44 as heretofore described.

By referring now to FIGURES 1, 4, 5 and 6 it will be seen that the forward edge of the silk screen frame 29 has an angularly disposed transversely extending ledge 46 thereon which is adapted to underlie the squeegee 36 when the silk screen frame is in rearmost position, as shown in FIGURES 1, 2 and 4 of the drawings. It will thus be seen that when a section of tubular material such as the handle H is positioned on the ends 43 and 44 of the shafts 39 and 40 and paint is positioned in the silk screen frame 29 on the silk screen 30, as heretofore described and the foot control valve actuated, the pneumatic piston and cylinder assembly 22 will move the arm 19 from the position shown in solid lines in FIGURE 4 of the drawings to the positions shown in solid lines in FIGURES 5 and 6 of the drawings in a continuous motion whereby the silk screen frame 29 and the silk screen 30 will move from the position shown in FIGURE 4 of the drawing to the positions shown in FIGURES 5 and 6 of the drawings in a continuous even horizontal motion while the handle H revolves one revolution therebeneath in engagement with the silk screen. It will be observed that rollers 33a supporting the squeegee frame member 33 and the squeegee 36 will move angularly downwardly on the cams 34 from the position shown in FIGURE 4 at the beginning of the cycle to the channel engaging members 17 and horizontally to the position shown in FIGURE 5 with the squeegee 36 engaging the silk screen 30 and thereby insures an even flow of paint through the silk screen design onto the handle H as will be understood by those skilled in the silkscreen art. Subsequently the squeegee frame member 33 and the squeegee 36 move angularly upwardly as the rollers 33a, which indirectly support the squeegee 36, engage secondary cams 47 which are also mounted on the channel engaging members 17.

In order that the paint on the silk screen 30 in the silk screen frame 29 may be moved back across the silk screen 30 for a subsequent cycle, a blade 48 is positioned longitudinally of the silk screen 30 and supported on hooks 49 on the ends of a pair of arms 50 which arms 50 are joined intermediate their ends by angle members 51 and at their rearmost ends by a cross frame member 52. The arms 50 are supported on a pair of V-shaped members 53 one arm each of which is provided with a roller 54 and the other arm of each of which is weighted as at 55. The bottom portion of each of the arms 50 has a cam 56 thereon and each of the arms 50 is slotted as at 57. Rollers 58 are positioned in the slots 57 and secured to upright supports 59 which in turn are positioned on the top 12. The cross member 52 which connects the rearmost ends of the arms 50 is engaged by a coil spring 60 the other end of which is secured to an upright support 61 attached to the top 12, as best seen in FIGURES 4, 5, 6 of the drawings.

By referring now to FIGURE 4 of the drawings it will be seen that the silk screen 30 on its silk screen frame 29 is shown at the beginning of its travel to the left as at the beginning of a paint cycle and that the blade 48 is in elevated relation to the paint on the silk screen 30. The previously described action of the squeegee 36; moving down into the silk screen frame 29 and insuring delivery of paint through the design in the silk screen 30 to the handle H revolving therebeneath now occurs. The blade 48 remains in elevated position until the rearmost portion of the silk screen frame 29 engages depending portions 62 on the arms 50 and moves the arms 50 forwardly, to the left, as shown in FIGURES 5 and 6 of the drawings to a point where the cam 56 engages the roller 54 on the V-shaped support 53 and moves it to the position shown in FIGURE 6 of the drawings. The arms 50 then move downwardly, pivoting on the rollers 58, and position the blade 48 adjacent the silk screen 30. The silk screen having completed its forward travel and moved to the position shown in solid lines in FIGURE 6, now reverses position and moves to the rear of the machine by reason of the reversing action of the pneumatic piston and cylinder assembly 22 as heretofore described, thus causing the paint on the silk screen to be engaged by the blade 48 and moved from the rear and right side thereof, as shown in FIGURE 6 of the drawings, to the front and left side thereof. The return travel of the silk screen 30 does not engage the handle H therebeneath it as the squeegee 36 which depresses the silk screen 30 sufficiently to engage the handle H has been elevated by the action of the rollers 33a engaging the secondary cams 47 as heretofore described. The squeegee 36 and its supporting frame member 33 are held in elevated position by a gravity actuated pawl 63 pivoted to the member 31 by a pivot 64 and which pawl 63 drops into place partially beneath the squeegee frame 33 when the same is elevated by the cams 47, as shown in FIGURE 6. The squeegee 36 and its frame 33 remain in elevated position until the silk screen 30 and its frame 29 have been moved to the right to the position shown in FIGURE 4 and again started toward the left whereupon a pin 65 on one side of one of the cams 34 engages a lever 63a, also pivoted to pivot 64 and engaged upon the pawl 63, and thereby lifts the pawl 63 to release the squeegee 36 and its frame 33. The lever 63a is free to move in the opposite direction without affecting the pawl 63 when the pin 65 engages it moving in the other direction. Thus the squeegee 36 is in lower position engaging the silk screen 30 when the silk screen moves to the left as seen in FIGURES 4, 5 and 6 and the squeegee 36 is in elevated position when the silk screen 30 moves to the right. The striped or decorated handle H is removed from the machine when the silk screen is in its rearmost retracted position, as seen in FIGURES 1, 2 and 4 of the drawings and another handle to be striped or decorated is substituted therefor and the machine recycled. The handle H shown in FIGURES 1, 2 and 7 of the drawings has a bifurcated bracket formed on the left end thereof which bracket is part of a standard handle assembly of a long handled grass shears and it will be observed that the machine provides adequate clearance for this part which has previously been welded to the handle H.

FIGURE 7 shows the handle H with the complete spiral paint stripe formed thereon, the same being indicated by the letter S it being observed that the spiral stripe extends continuously from one end of the handle H to the other with no indication that it was applied from 7 diagonally positioned longitudinally alined painting portions in the silk screen 30, as shown in FIGURE 9.

It will be understood by those skilled in the art that the stripe S disclosed herein is illustrative only and that the machine is capable of applying a plurality of stripes rather than one stripe or a plurality of other designs depending on the indicia or design formed in the silk screen 30.

It will thus be seen that a machine meeting the objects of the invention has been disclosed and having thus described my invention, what I claim is:

1. In a machine for applying paint to an elongated cross sectionally round article in a desired pattern comprising a supporting frame having spaced axially aligned shafts for engaging the ends of the article to be painted and a rack and gear for rotating said shafts and said article to be painted; a horizontally disposed silk screen frame having a silk screen thereon and a pair of elongated movable sliding members on said supporting frame supporting said silk screen frame above said article to be painted, a mechanism on said supporting frame for moving said elongated sliding members, said silk screen frame and silk screen thereon transversely of said article to be painted, a pair of vertically slotted spaced upright frame members on said supporting frame adjacent one end thereof, a squeegee frame having its opposite ends engaged in said vertically slotted upright frame members, a squeegee mounted on said squeegee frame member in depending relation thereto and normally engaging said silk screen, oppositely disposed spaced inclined cams on each of said elongated movable sliding members for engaging said squeegee frame member to impart vertical motion thereto when said elongated movable sliding members are moved in one direction and a pawl on said vertically slotted spaced upright frame member for holding said squeegee frame member in elevated relation to said silk screen when said elongated movable sliding members are moved in the opposite direction, a lever on one of said upright frame members engaging said pawl and means on one of said cams for engaging and moving said lever to move said pawl to release said squeegee frame member said mechanism comprising a motive power source including a reciprocating member for moving said elongated movable sliding members, said rack being attached to one of said elongated movable sliding members and said gear being mounted on one of said axially aligned shafts.

2. In a machine for applying paint to an elongated cross sectionally round article in a desired pattern comprising a supporting frame having spaced axially aligned shafts for engaging the ends of said article to be painted and a rack and gear for rotating said shafts and said article to be painted; a horizontally disposed silk screen frame having a silk screen thereon and a pair of elongated movable sliding members on said supporting frame supporting said silk screen frame above said article to be painted, a mechanism on said supporting frame for moving said elongated sliding members, said silk screen frame and silk screen thereon transversely of said article to be painted, a pair of vertically slotted spaced upright frame members on said supporting frame adjacent one end thereof, a squeegee frame having its opposite ends engaged in said vertically slotted upright frame members, a squeegee mounted on said squeegee frame in depending relation thereto and normally engaging said silk screen, oppositely disposed spaced inclined cams on each end of each of said elongated movable sliding members for engaging said squeegee frame to impart vertical motion thereto when said elongated movable sliding members are moved in opposite directions and pawls on said vertically slotted spaced upright frame members for holding said squeegee frame in elevated relation to said silk screen when said elongated movable sliding members are moved in one direction, a lever on each of said upright frame members positioned for engagement with said pawls and pins on the cams on the one end of each of said elongated movable sliding members for engaging and moving said levers to move said pawls to release said squeegee frame, a blade for moving paint on said silk screen, a pair of arms movably supported on said frame and arranged for longitudinal and vertical movement with respect to said frame, said blade being carried on said arms, a V-shaped bracket pivoted to said supporting frame for supporting said arms in elevated relation, a cam on said arms for engaging said V-shaped bracket to move said bracket and lower said arms and said blade, said mechanism comprising a motive power source including a reciprocating member for moving said elongated movable sliding members, said rack being attached to one of said elongated movable sliding members and said gear being mounted on one of said axially aligned shafts.

3. A machine for applying paint to an elongated cross sectionally round article in a desired pattern comprising a support, means for mounting and revolving said article on a horizontal axis, said means comprising spaced axially aligned shafts, a horizontally disposed silk screen frame having a silk screen thereon, spaced parallel members reciprocally mounted on said support above said shafts, said silk screen frame carried on said members with said silk screen in closely spaced relation to said article to be painted, a rack reciprocably mounted on said support and connected to one of said members, a gear on one of said shafts engaged on said rack, means for moving said silk screen into engagement with said article to be painted, said means comprising a squeegee, vertically positioned guide members on said support on either side of said parallel members, said squeegee movably mounted on said guide members, means for elevating said squeegee at such time as said silk screen is moved to position said squeegee at one end thereof and means to lower said squeegee when said silk screen is moved to position said squeegee above the other end thereof, said means including inclined cams on said parallel members, rollers on said squeegee for engaging said cams, a blade for moving paint in one direction on said silk screen, a pair of arms movably positioned on said support above said silk screen and arranged for movement with respect to said silk screen, said blade carried on said arms and means for moving said silk screen frame in a reciprocal motion relative to said article to be painted.

References Cited in the file of this patent
UNITED STATES PATENTS

| | | |
|---|---|---|
| 787,542 | Rudometoff | Apr. 18, 1905 |
| 1,922,710 | Owens | Aug. 15, 1933 |
| 2,105,572 | Williams | Jan. 18, 1938 |
| 2,202,799 | Jackson et al. | May 28, 1940 |
| 2,307,404 | Heyne | Jan. 5, 1943 |
| 2,498,917 | Gattuso | Feb. 28, 1950 |
| 2,579,461 | Barlow et al. | Dec. 25, 1951 |
| 2,709,404 | Stokes | May 31, 1955 |